(12) United States Patent
Ito et al.

(10) Patent No.: US 10,280,834 B2
(45) Date of Patent: May 7, 2019

(54) VALVE CONTROL DEVICE AND VALVE SYSTEM

(71) Applicants: KEIHIN CORPORATION, Tokyo (JP); HONDA MOTOR CO., LTD., Tokyo (JP)

(72) Inventors: Hiroshi Ito, Tokyo (JP); Takuya Yahagi, Tokyo (JP); Youichiro Shikine, Tokyo (JP); Tomohide Ichikawa, Tokyo (JP); Kensuke Yamamoto, Utsunomiya (JP); Akihito Inoue, Nasukarasuyama (JP)

(73) Assignees: KEIHIN CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/559,961

(22) PCT Filed: Mar. 24, 2016

(86) PCT No.: PCT/JP2016/059333
§ 371 (c)(1),
(2) Date: Sep. 20, 2017

(87) PCT Pub. No.: WO2016/152963
PCT Pub. Date: Sep. 29, 2016

(65) Prior Publication Data
US 2018/0106187 A1    Apr. 19, 2018

(30) Foreign Application Priority Data
Mar. 26, 2015   (JP) .................................. 2015-064676

(51) Int. Cl.
*F02B 37/18*    (2006.01)
*F16K 31/04*    (2006.01)
(Continued)

(52) U.S. Cl.
CPC ........ *F02B 37/183* (2013.01); *F02D 41/0007* (2013.01); *F02D 41/2464* (2013.01);
(Continued)

(58) Field of Classification Search
CPC ...... F02B 37/183; F02B 37/18; F16K 31/046; F16K 37/0041; G05B 9/02; G05D 3/12;
(Continued)

(56) References Cited

U.S. PATENT DOCUMENTS 7,121,258 B2 * 10/2006 Nakamoto .............. F02D 9/109
123/399
7,171,946 B1  2/2007 Watanabe
(Continued)

FOREIGN PATENT DOCUMENTS

CN          1570440 A      1/2005
CN        201155608 Y     11/2008
(Continued)

OTHER PUBLICATIONS

International Search Report & Written Opinion dated Jun. 21, 2016 corresponding to International Patent Application No. PCT/JP2016/059333, and English translation thereof.
(Continued)

*Primary Examiner* — Hoai-An D. Nguyen
(74) *Attorney, Agent, or Firm* — Squire Patton Boggs (US) LLP (57) ABSTRACT

A valve control device includes a drive circuit for supplying a drive signal to an actuator adjusting an opening degree of a valve via a prescribed transmission line, generates a PWM signal on the basis of a target opening degree supplied from the outside and a sensor signal that indicates a real opening degree of the valve, and supplies the PWM signal to the drive circuit. The valve control device includes a disconnection detection unit which detects, on the basis of the
(Continued)

PWM signal and a monitor signal of the drive signal, whether the transmission line is disconnected.

7 Claims, 4 Drawing Sheets

(51) Int. Cl.
    *G05B 9/02*         (2006.01)
    *G05D 3/12*         (2006.01)
    *H02P 7/00*         (2016.01)
    *F16K 37/00*       (2006.01)
    *F02D 41/00*       (2006.01)
    *F02D 41/24*       (2006.01)
    *H02P 7/29*         (2016.01)

(52) U.S. Cl.
    CPC ........ *F16K 31/046* (2013.01); *F16K 37/0041* (2013.01); *G05B 9/02* (2013.01); *G05D 3/12* (2013.01); *H02P 7/00* (2013.01); *H02P 7/2913* (2013.01); *F02B 37/18* (2013.01); *F02D 2250/16* (2013.01); *H02P 2209/09* (2013.01); *Y02T 10/144* (2013.01)

(58) Field of Classification Search
    CPC ........ H02P 7/00; H02P 2209/09; F02D 11/00; F02D 11/10; F02D 11/106; F02D 11/107; F02D 2011/108; F02D 2041/2089; F02D 41/0007; F02D 41/2464; F02D 2250/16; Y02T 10/144
    USPC ....... 324/500, 512, 522, 523, 527, 528, 537, 324/600, 649, 691, 713, 718; 702/1, 57, 702/64; 123/319, 350, 352, 361, 396, 123/399
    See application file for complete search history.

(56) References Cited

U.S. PATENT DOCUMENTS

| | | | |
|---|---|---|---|
| 7,638,993 B2* | 12/2009 | Valentino | H02M 3/157 323/222 |
| 8,846,829 B2* | 9/2014 | Hendrickson | B01J 8/1809 422/111 |
| 9,270,505 B2* | 2/2016 | Mori | H04B 3/54 |

FOREIGN PATENT DOCUMENTS

| | | |
|---|---|---|
| CN | 201215215 Y | 4/2009 |
| CN | 103422979 A | 12/2013 |
| JP | 06-249040 A | 9/1994 |
| JP | 3189717 B2 | 7/2001 |
| JP | 2004-332613 A | 11/2004 |
| JP | 2007-138743 A | 6/2007 |

OTHER PUBLICATIONS

Chinese Office Action corresponding to Application No. 201680017312.0, dated Aug. 23, 2018.

* cited by examiner

VALVE CONTROL DEVICE AND VALVE SYSTEM

TECHNICAL FIELD

The present invention relates to a valve control device and a valve system.

Priority is claimed on Japanese Patent Application No. 2015-064676, filed on Mar. 26, 2015, the content of which is incorporated herein by reference.

BACKGROUND ART

As is commonly known, a wastegate valve is a type of control valve provided on a bypass passage for engine exhaust gas in a supercharger, and is for adjusting a supercharging pressure of combustion air supplied to an engine. A wastegate valve control device for a supercharger-equipped internal combustion engine disclosed in Patent Literature 1 below controls an air bypass valve when an abnormality occurs in a drive mechanism for a wastegate valve, and thereby copes with the abnormality. That is, when the abnormality occurs in the drive mechanism for the wastegate valve, the wastegate valve communicates with the air bypass passage, and thereby the wastegate valve control device suppresses an abnormal rise in the supercharging pressure.

CITATION LIST

Patent Literature

[Patent Literature 1]
Japanese Unexamined Patent Application, First Publication No. 2004-332613

SUMMARY OF INVENTION

Technical Problem

Meanwhile, when the wastegate valve encounters an operation disabled state due to some sort of abnormality, it is very important to accurately and rapidly specify a cause thereof. The related art is for coping with the abnormality of the drive mechanism for the wastegate valve, that is, an actuator that drives the wastegate valve or a coupling mechanism that mechanically connects the actuator and the wastegate valve, but does not contribute to specifying a cause of an abnormality in an accurate and rapid way. Especially, it is very important to find out whether the cause of the abnormality is attributed to an electrical factor (e.g., the actuator) or a mechanical factor (the coupling mechanism) in coping with the abnormality.

An aspect of the present invention was made in view of the above circumstances, and an object thereof is to provide a valve control device and a valve system capable of accurately and rapidly detecting disconnection of a transmission line that supplies a drive signal to an actuator for a wastegate valve.

Solution to Problem

To solve the above technical problems to achieve the related object, the present invention adopts the following aspects.

(1) A valve control device of an aspect according to the present invention has a drive circuit supplying a drive signal to an actuator adjusting a degree of opening of a valve via a predetermined transmission line, generates a PWM signal on the basis of a target degree of opening supplied from an outside and a sensor signal indicating a real degree of opening of the valve, and supplies the generated PWM signal to the drive circuit, and includes a disconnection detecting unit configured to detect, on the basis of the PWM signal and a monitor signal of the drive signal, whether the transmission line is disconnected.

(2) In the aspect according to (1) above, the disconnection detecting unit may acquire a monitor voltage of the drive signal as the monitor signal, and determine that the transmission line is disconnected when a state in which the monitor voltage is lower than or equal to a predetermined voltage threshold and the duty ratio of the PWM signal is higher than or equal to a predetermined DUTY threshold continues for a predetermined evaluation time.

(3) In the aspect according to (1) above, the drive circuit may include a self-diagnostic function of diagnosing its own soundness, and the disconnection detecting unit may detect the disconnection of the transmission line on the basis of a result of self-diagnosis of the drive circuit in addition to the PWM signal and the monitor signal of the drive signal.

(4) In the aspect according to (3) above, the disconnection detecting unit may acquire a monitor voltage of the drive signal as the monitor signal, and determine that the transmission line is disconnected when, after a state in which the monitor voltage is lower than or equal to a predetermined voltage threshold and the duty ratio of the PWM signal is higher than or equal to a predetermined DUTY threshold continues for a predetermined first evaluation time, a sound state of the drive circuit continues for a predetermined second evaluation time.

(5) In the aspect according to any one of (1) to (4) above, when the actuator is a motor, the disconnection detecting unit may calculate an effective drive duty ratio excluding influence of a back electromotive force generated from a duty ratio of the PWM signal by the motor, and compare the effective drive duty ratio with the DUTY threshold.

(6) In the aspect according to any one of (1) to (5) above, the valve may be a wastegate valve provided for a supercharger for the engine.

(7) A valve system of an aspect according to the present invention includes: a valve; an actuator; and the valve control device according to any one of (1) to (6).

Advantageous Effects of Invention

According to the present invention, the disconnection detecting unit for detecting the disconnection of the transmission line on the basis of the PWM signal and the drive signal is provided. For this reason, a valve control device and a valve system capable of accurately and rapidly detecting the disconnection of the transmission line supplying the drive signal to the actuator for the valve can be provided.

DESCRIPTION OF EMBODIMENTS

Hereinafter, an embodiment of the present invention will be described with reference to the drawings.

Figure 1:
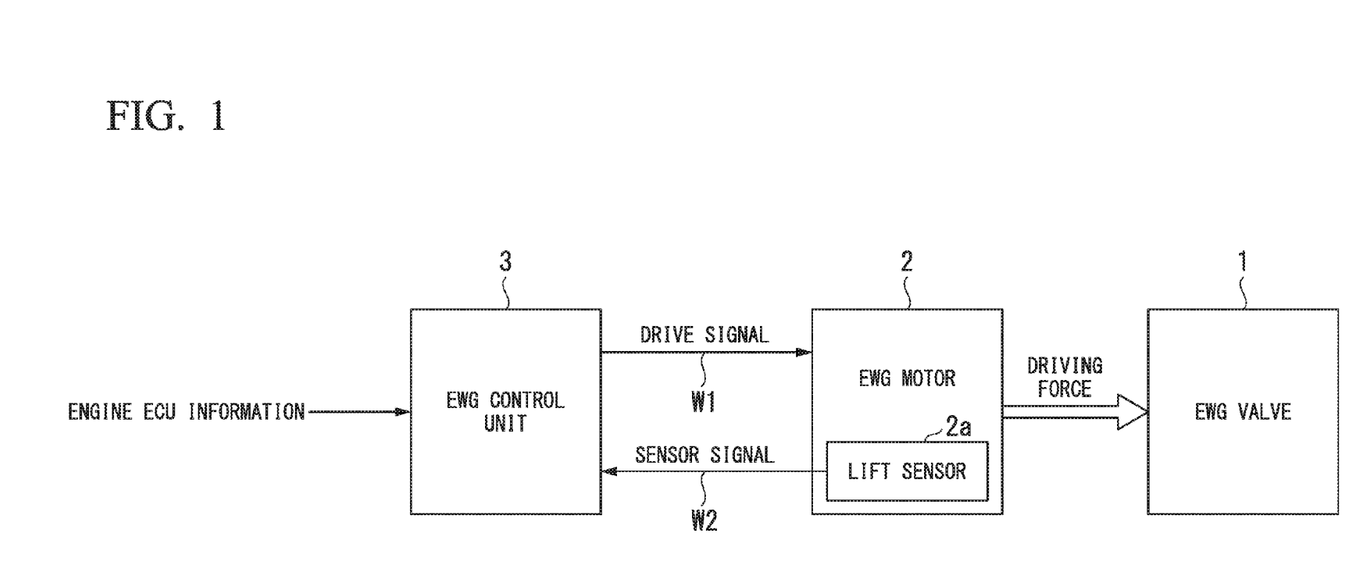
FIG. 1 is a block diagram illustrating a functional constitution of a valve system according to an embodiment of the present invention.

A valve system and valve control device according to the present embodiment include, as illustrated in FIG. 1, an EWG valve 1, an EWG motor 2, and an EWG control unit 3. In the present embodiment, "EWG" is short for "electric waste gate."

The EWG valve 1 is a wastegate valve that is provided on a bypass passage for engine exhaust gas in a supercharger, and adjusts a supercharging pressure of combustion air supplied to an engine. That is, when a degree of opening of the EWG valve 1 is increased, the supercharging pressure is reduced. In contrast, when the degree of opening of the EWG valve 1 is reduced, the supercharging pressure is increased. This EWG valve 1 is mechanically connected to the EWG motor 2 via a predetermined coupling mechanism, and the degree of opening thereof is adjusted (operated) by a driving force of the EWG motor 2. The supercharger is an auxiliary machine of the engine as is well known, and adjusts the supercharging pressure of the combustion air supplied to the engine in cooperation with the wastegate valve.

Here, the degree of opening of the EWG valve 1 is a physical amount regulated by a position (a lift amount) of a valve body relative to a valve seat in the EWG valve 1. In other words, when the lift amount is increased, that is, when a distance of the valve body from the valve seat is increased, the degree of opening of the EWG valve 1 is increased. In contrast, when the lift amount is reduced, that is, when the distance of the valve body from the valve seat is reduced, the degree of opening of the EWG valve 1 is reduced.

The EWG motor 2 is an actuator that drives the EWG valve 1, for instance, a direct current motor. The EWG motor 2 and the EWG control unit 3 are electrically connected by a predetermined transmission line W1. The EWG motor 2 is operated on the basis of a drive signal input from the EWG control unit 3 via the transmission line W1, and operates the degree of opening of the EWG valve 1. The transmission line W1 is at least a pair of power lines for transmitting the drive signal.

The EWG motor 2 includes a lift sensor 2a. The lift sensor 2a outputs a voltage indicating an actual lift amount (a real lift amount) of the valve body in the EWG valve 1 as a sensor signal. The EWG motor 2 and the EWG control unit 3 are electrically connected by a predetermined signal line W2. The lift sensor 2a outputs the sensor signal to the EWG control unit 3 via the signal line W2. The sensor signal is also a degree-of-opening signal indicating the real lift amount of the EWG valve 1, that is, a real degree of opening of the EWG valve 1.

The EWG control unit 3 is a valve control device in the present embodiment, and adjusts the degree of opening of the EWG valve 1 by operating the EWG motor 2. The EWG control unit 3 is one control functional element in an engine ECU that acquires the sensor signal from the lift sensor 2a and acquires a variety of information (engine ECU information) from a master control functional element constituting a master control system in the engine ECU. The EWG control unit 3 generates the drive signal on the basis of the engine ECU information and the sensor signal, and thereby operates the EWG motor 2.

The engine ECU information is an instruction signal of the engine ECU that is a control device for the engine or a signal that indicates an engine operating state, and is for instance a target lift amount, an IG ON signal, and so on. This EWG control unit 3 has feedback control of the EWG motor 2 on the basis of the engine ECU information and the real lift amount indicated by the sensor signal.

The target lift amount is a control target value indicating a degree-of-opening target of the EWG valve 1. The IG ON signal is a signal indicating an ON/OFF state of an ignition switch or a startup signal indicating a startup state of the engine.

Figure 2:
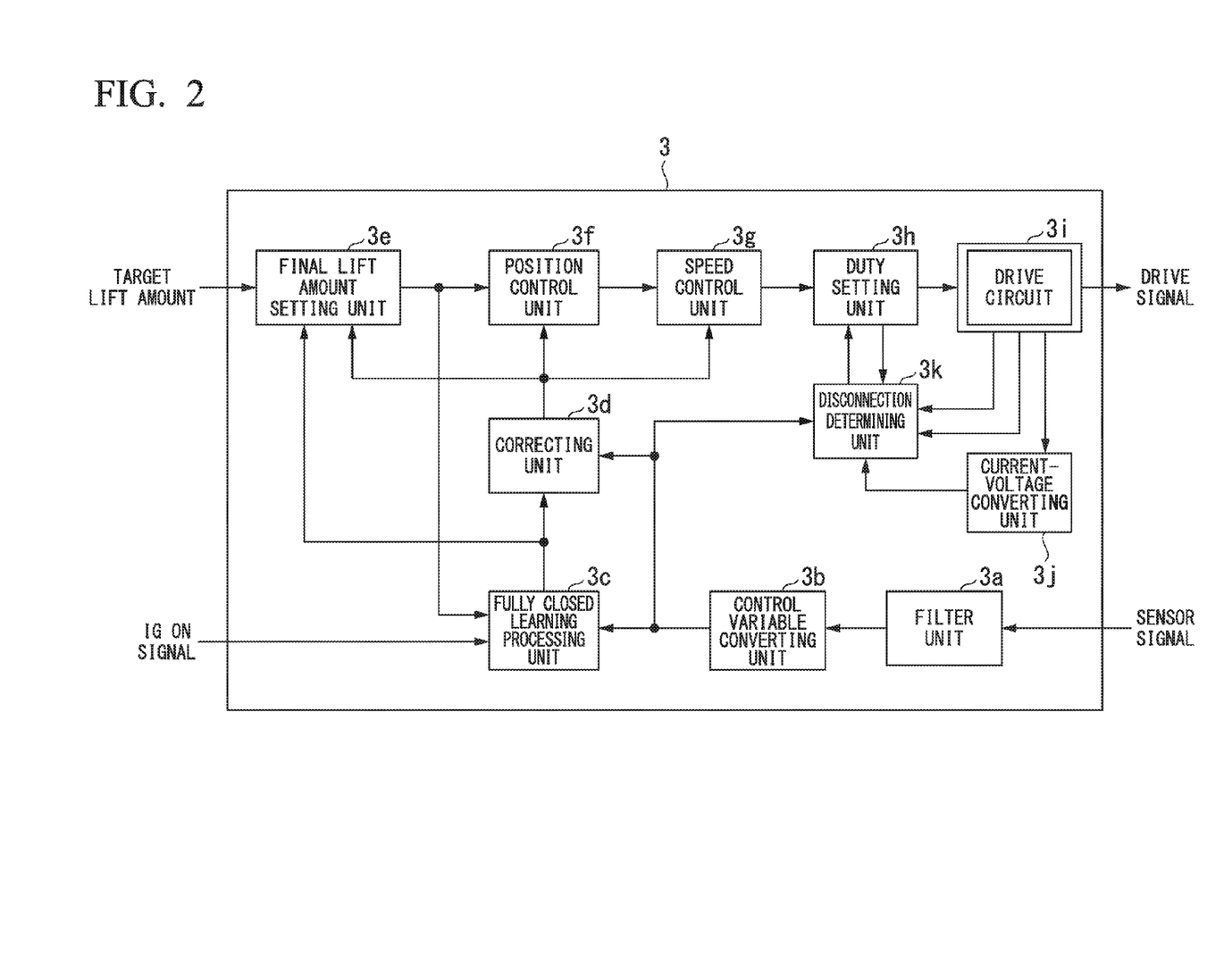
FIG. 2 is a block diagram illustrating a functional constitution of a valve control device according to the embodiment of the present invention.

As illustrated in FIG. 2, this EWG control unit 3 includes a filter unit 3a, a control variable converting unit 3b, a fully closed learning processing unit 3c, a correcting unit 3d, a final lift amount setting unit 3e, a position control unit 3f, a speed control unit 3g, a DUTY setting unit 3h, a drive circuit 3i, a current-voltage converting unit 3j, and a disconnection determining unit 3k. Among these functional components, the current-voltage converting unit 3j and the disconnection determining unit 3k constitute disconnection detecting means in the present invention. The "DUTY" is a term indicating a duty ratio.

The filter unit 3a converts a sensor signal or an analog voltage signal, which is input from the lift sensor 2a, into a digital signal (detected voltage data), performs median filtering (digital signal processing) on the digital signal, and outputs the result to the control variable converting unit 3b. The median filtering is filtering used to remove noise by extracting a medium value (a median) of each predetermined amount of data with respect to detected voltage data that is time series data. The lift sensor 2a outputting the sensor signal makes it easy for various kinds of noise to overlap because it is provided for the EWG motor 2 attached to the engine, but the filter unit 3a outputs the detected voltage data, which more accurately indicates the real lift amount (the real degree of opening) by removing this noise, to the control variable converting unit 3b.

Here, moving average processing is generally used in the digital signal processing for removing the noise. However, since the median filtering has higher noise removal performance than the moving average processing, the filter unit 3a adopts the median filtering. In the present embodiment, the speed control unit 3g is provided in addition to the position control unit 3f. However, the speed control unit 3g calculates a speed control variable using a differential value of the real lift amount, and thus is easily affected by noise overlapping the real lift amount (the real degree of opening). In the present embodiment, since this speed control unit 3g is provided, the median filtering is adopted instead of the moving average processing.

The control variable converting unit 3b converts the detected voltage data (the voltage amount) into the real lift amount (the position). The control variable converting unit 3b has, for instance, a conversion table showing a relation between the detected voltage data (the voltage amount) and the real lift amount, extracts the real lift amount equivalent to the detected voltage data on the basis of the conversion table, and outputs the extracted lift amount to the fully closed learning processing unit 3c. In place of the conversion table, a conversion formula showing the relation between the detected voltage data and the real lift amount may be pre-stored, and the real lift amount equivalent to the detected voltage data may be extracted on the basis of the conversion formula.

The fully closed learning processing unit 3c is a functional component that learns the real lift amount (the seated position) as a fully closed lift amount when the valve body of the EWG valve 1 is seated on the valve seat. The fully closed lift amount varies depending on a temperature of the EWG valve 1, and thus cannot be treated as a fixed value. Due to these circumstances, the fully closed learning processing unit 3c learns the real lift amount (the seated position) as the fully closed lift amount when the valve body of the EWG valve 1 is seated on the valve seat on the basis of the IG ON signal and the real lift amount input from the control variable converting unit 3b.

Here, the fully closed lift amount includes a long-term learning value and a short-term learning value. The long-term learning value is a learning value acquired whenever the engine is started, whereas the short-term learning value is a learning value acquired whenever the valve body is seated. That is, when it is determined on the basis of the IG ON signal that the engine is started, the fully closed learning processing unit 3c stores the fully closed lift amount when the valve body of the EWG valve 1 is seated first after the engine is started as the long-term learning value. On the other hand, whenever the valve body of the EWG valve 1 is seated on the valve seat, the fully closed learning processing unit 3c stores the fully closed lift amount at that time as the short-term learning value regardless of the starting of the engine.

The fully closed learning processing unit 3c also uses the IG ON signal indicating the starting of the engine in addition to the real lift amount input from the control variable converting unit 3b, thereby acquiring the long-term learning value, and acquires the short-term learning value on the basis of only the real lift amount input from the control variable converting unit 3b. This fully closed learning processing unit 3c outputs the long-term and short-term learning values to the final lift amount setting unit 3e, and outputs only the short-term learning value to the correcting unit 3d.

The correcting unit 3d is a functional component that compensates for the real lift amount input from the control variable converting unit 3b on the basis of the short-term learning value input from the fully closed learning processing unit 3c. That is, the correcting unit 3d takes a difference between the real lift amount and the short-term learning value, and thereby calculates a lift amount (a correction lift amount) based on the short-term learning value and outputs the correction lift amount to the position control unit 3f and the speed control unit 3g.

The final lift amount setting unit 3e sets a final target lift amount (a control target value) on the basis of the target lift amount input as a piece of engine ECU information from the engine ECU, the long-term and short-term learning values input from the fully closed learning processing unit 3c, and the correction lift amount input from the correcting unit 3d. The target lift amount is a signal designating the lift amount (the degree of opening) of the EWG valve 1 as a square-wave voltage value. With respect to this target lift amount, the final lift amount setting unit 3e performs specific processing on the target lift amount when the valve body of the EWG valve 1 is seated on the valve seat, thereby generating the final target lift amount with which the valve body can make a soft landing on the valve seat.

That is, the final lift amount setting unit 3e divides a period required until the valve body is seated after initiating movement (downward movement relative to the valve seat) for the seating of the valve body into two periods, a former period and a latter period, and generates the final target lift amount with which the valve body makes a soft landing on the valve seat by moving the valve body downward at a highest speed in the former period and by relatively gently moving the valve body in the latter period. The final lift amount setting unit 3e sets a switching point (a soft landing initiation position) between the former and latter periods and a final stop target lift amount of the valve body on the basis of the long-term learning value and the short-term learning value.

The position control unit 3f generates a position operation amount and outputs it to the speed control unit 3g. That is, the position control unit 3f performs well-known PID processing on a difference between the final target lift amount (the control target value) input from the final lift amount setting unit 3e and the correction lift amount (the control variable) input from the correcting unit 3d, thereby generating the position operation amount.

The speed control unit 3g generates a speed operation amount on the basis of the position operation amount input from the position control unit 3f and the correction lift amount input from the correcting unit 3d, and outputs the speed operation amount to the DUTY setting unit 3h. That is, the speed control unit 3g performs limiter processing on the position operation amount input from the position control unit 3f, performs differential processing on the correction lift amount input from the correcting unit 3d, and performs well-known PID processing on a difference between the position operation amount after the limiter processing and a lift speed obtained by the differential processing to thereby generate the speed operation amount.

The DUTY setting unit 3h and the drive circuit 3i will be described. For convenience, the drive circuit 3i will be described first. The drive circuit 3i is a motor drive circuit having a pulse drive system. That is, the drive circuit 3i converts direct current power into pulse width modulation (PWM) power on the basis of a PWM signal input from the DUTY setting unit 3h as a control signal, and outputs the PWM power to the EWG motor 2 as a drive signal.

Here, among the functional components constituting the EWG control unit 3, the functional components other than the drive circuit 3i and the current-voltage converting unit 3j are software components that are realized by a microprocessing unit (MPU) executing a dedicated control program. In contrast, the drive circuit 3i and the current-voltage converting unit 3j are independent of the software components, and are hardware components made up of a plurality of circuit elements.

Between the drive circuit 3i and the current-voltage converting unit 3j, the drive circuit 3i is realized by an exclusive motor driving IC. The exclusive motor driving IC has a function of the drive circuit 3i as a basic function, and has a function (a driving current monitor function) of monitoring a driving current that is fed to the EWG motor 2 by its own drive signal. That is, the exclusive motor driving IC (the drive circuit 3i) outputs a monitor current for a current obtained by dividing the driving current by a predetermined specified number on the basis of the driving current monitor function, that is, for the driving current, to the current-voltage converting unit 3j as a monitor signal.

The exclusive motor driving IC (the drive circuit 3i) has a self-diagnostic function of evaluating its own soundness. The self-diagnostic function is for evaluating, for instance, whether an overcurrent or overheating occurs inside the IC, and outputs a drive circuit abnormality to the disconnection determining unit 3k as a self-diagnostic result when an internal abnormality occurs. The drive circuit abnormality is a signal having a logic value of "1" when no internal abnormality occurs. Further, the exclusive motor driving IC (the drive circuit 3i) has a function of outputting drive circuit permission to the outside. The drive circuit permission is a signal indicating whether output of the drive signal is in an allowable state. The drive circuit permission is a signal having a logic value of "1" in a state in which the output of the drive signal is allowable.

On the other hand, the DUTY setting unit 3h is a PWM signal generator for generating the PWM signal on the basis of the speed operation amount input from the speed control unit 3g. The DUTY setting unit 3h has a function (as a DUTY limiter) of performing the limiter processing on the speed operation amount. That is, the DUTY setting unit 3h fixes a duty ratio (DUTY), an upper limit of which is limited and which is appropriate for the speed operation amount, on the basis of the speed operation amount and the DUTY limiter, and generates the PWM signal corresponding to the duty ratio.

Here, the duty ratio has a maximum value (an upper limit) of, for instance, 100%, and is a bipolar amount in which a rotational direction (a first rotational direction) of the EWG motor 2 when the EWG valve 1 is closed assumes positive polarity and a rotational direction (a second rotational direction) of the EWG motor 2 when the EWG valve 1 is opened assumes negative polarity. That is, the duty ratio is an amount that varies within a range of ±100% depending on the speed operation amount. The DUTY setting unit 3h outputs this duty ratio (DUTY) to the disconnection determining unit 3k as a piece of determination information.

The current-voltage converting unit 3j constitutes disconnection detecting means along with the disconnection determining unit 3k, and includes a shunt resistor that converts the monitor current (the monitor signal) into a monitor voltage, and a low-pass filter that removes noise of the monitor voltage. The shunt resistor is a circuit element having a high-precision resistance value. The resistance value of the shunt resistor controls a conversion ratio between the monitor current and the monitor voltage, and thus has very high precision. The low-pass filter is a primary RC filter (a hardware filter) that is made up of a resistor having a predetermined resistance value and a capacitor having predetermined capacitance. This current-voltage converting unit 3j converts the monitor current into the monitor voltage using the shunt resistor, then removes the noise from the monitor voltage using the low-pass filter, and outputs the monitor voltage to the disconnection determining unit 3k.

The disconnection determining unit 3k determines whether the transmission line W1 connecting the EWG motor 2 and the EWG control unit 3 is disconnected on the basis of the monitor voltage input from the current-voltage converting unit 3j, the drive circuit abnormality and the drive circuit permission input from the drive circuit 3i, the duty ratio (DUTY) of the PWM signal input from the DUTY setting unit 3h, and the real lift amount input from the control variable converting unit 3b.

When a state in which the monitor voltage is lower than or equal to a predetermined voltage threshold and an effective drive duty ratio in the PWM signal is higher than or equal to a predetermined DUTY threshold continues for a predetermined first evaluation time T1, and then a sound state of the drive circuit (a state in which the drive circuit has no abnormality and is permitted (a state in which the drive circuit can output the drive signal)) continues for a predetermined second evaluation time T2, the disconnection determining unit 3k determines that the transmission line W1 is disconnected. Details of the disconnection determining process in the disconnection determining unit 3k will be described below as the operation of the EWG control unit 3.

Next, operations of the valve system and the valve control device configured in this way will be described in detail with further reference to FIGS. 3 and 4.

In the present embodiment, the EWG control unit 3 (the valve control device) generates a drive signal (an operation amount) on the basis of a target lift amount (a control target value) and a sensor signal (a control variable) as a basic operation. That is, the EWG control unit 3 has feedback control of the EWG motor 2 on the basis of the target lift amount and the sensor signal. As a result of the feedback control, a degree of opening of the EWG valve 1 connected to the EWG motor 2 is adjusted according to the target lift amount.

The final lift amount setting unit 3e sets a final target lift amount for normal driving on the basis of the target lift amount input from the engine ECU (the master control system), the long-term learning value and the short-term learning value input from the fully closed learning processing unit 3c, and the correction lift amount input from the correcting unit 3d. That is, the final lift amount setting unit 3e uses the long-term learning value and the short-term learning value with respect to the target lift amount that is the square-wave voltage value, so that a falling section when the EWG valve 1 is fully closed and a low level section in which a lift amount at the time of full closure is designated are corrected. Thereby, the final lift amount setting unit 3e generates a final target lift amount.

To be more specific, the final lift amount setting unit 3e sets an initiation lift amount (a soft landing initiation lift amount Lk) and a stop target lift amount Lt when the valve body of the EWG valve 1 is soft-landed on the valve seat on the basis of a long-term learning value, a short-term learning value, and a defined value (a constant) as follows.

$Lk$=Long-term learning value−Short-term learning value+Defined value $Lt$=Long-term learning value−Short-term learning value−Defined value The final lift amount setting unit 3e monitors correction lift amounts that are input from the correcting unit 3d in turn, and outputs a control target value reaching the stop target lift amount Lt at a predetermined slope (speed) when the correction lift amount is consistent with the soft landing initiation lift amount Lk.

Here, the soft landing initiation lift amount Lk and the stop target lift amount Lt are defined by the long-term learning value, the short-term learning value, and the defined value (the constant). However, since the correction lift amount is given as the difference between the real lift amount and the short-term learning value as described above, the soft landing initiation lift amount Lk and the stop target lift amount Lt are amounts that are substantially defined only by the long-term learning value and the defined value (constant). When the final lift amount setting unit 3e is configured to introduce the real lift amount rather than the correction lift amount, the soft landing initiation lift amount Lk becomes (Long-term learning value+Defined value), and the stop target lift amount Lt becomes (Long-term learning value−Defined value). The soft landing initiation lift amount Lk and the stop target lift amount Lt are defined only by the long-term learning value and the defined value (the constant).

On the other hand, the filter unit 3a sequentially samples sensor signals (analog signals) input from the lift sensor 2a, converts the results into detected voltage data (digital signals), and performs median filtering on the detected voltage data. Since a noise component derived from the sensor signal overlapping the detected voltage data is removed by the median filtering, the detected voltage data becomes a signal that more accurately indicates the lift amount. The detected voltage data (the voltage) from which noise is removed by the median filtering is converted into the lift amount (the position) in the control variable converting unit 3b, and is output to the fully closed learning processing unit 3c, the correcting unit 3d, and the disconnection determining unit 3k.

Among the real lift amounts that are sequentially input from the control variable converting unit 3b whenever the engine is started using the IG ON signal input from the engine ECU as a trigger signal, the lift amount when the valve body of the EWG valve 1 is seated on the valve seat is learned as the long-term learning value by the fully closed learning processing unit 3c. That is, the fully closed learning processing unit 3c determines, on the basis of the IG ON signal, that the engine is started, and acquires and updates the fully closed lift amount whenever the valve body of the EWG valve 1 is seated on the valve seat as the short-term learning value.

The fully closed learning processing unit 3c stores the long-term learning value when the engine is stopped in a non-volatile memory, and then outputs the stored long-term learning value as an initial value of the short-term learning value when the engine is started.

Between the long-term and short-term learning values acquired by this learning process, the long-term learning value is provided to the final lift amount setting unit 3e, and is used to generate the above final target lift amount, while the short-term learning value is supplied to the correcting unit 3d. In the correcting unit 3d, the short-term learning value is subtracted from the real lift amount, and the correction lift amount is generated.

The position control unit 3f generates a position operation amount on the basis of a difference between the final target lift amount and the correction lift amount and outputs the result to the speed control unit 3g. The speed control unit 3g generates a speed operation amount on the basis of a difference between the position operation amount and the correction lift amount. The DUTY setting unit 3h generates a PWM signal for which a duty ratio is set depending on the speed operation amount, and outputs the result to the drive circuit 3i. The drive circuit 3i generates a drive signal having a wave height value appropriate for the PWM signal to operate the EWG motor 2. A speed limiter is set for the speed control unit 3g, and a DUTY limiter is set for the DUTY setting unit 3h. Thus, the highest rotational speed of the EWG motor 2 is reliably limited within an allowable range.

The basic operation of the EWG control unit 3 (the valve control device) has been described above. The disconnection detecting means made up of the current-voltage converting unit 3j and the disconnection determining unit 3k detects disconnection of the transmission line W1 as follows.

Figure 3:
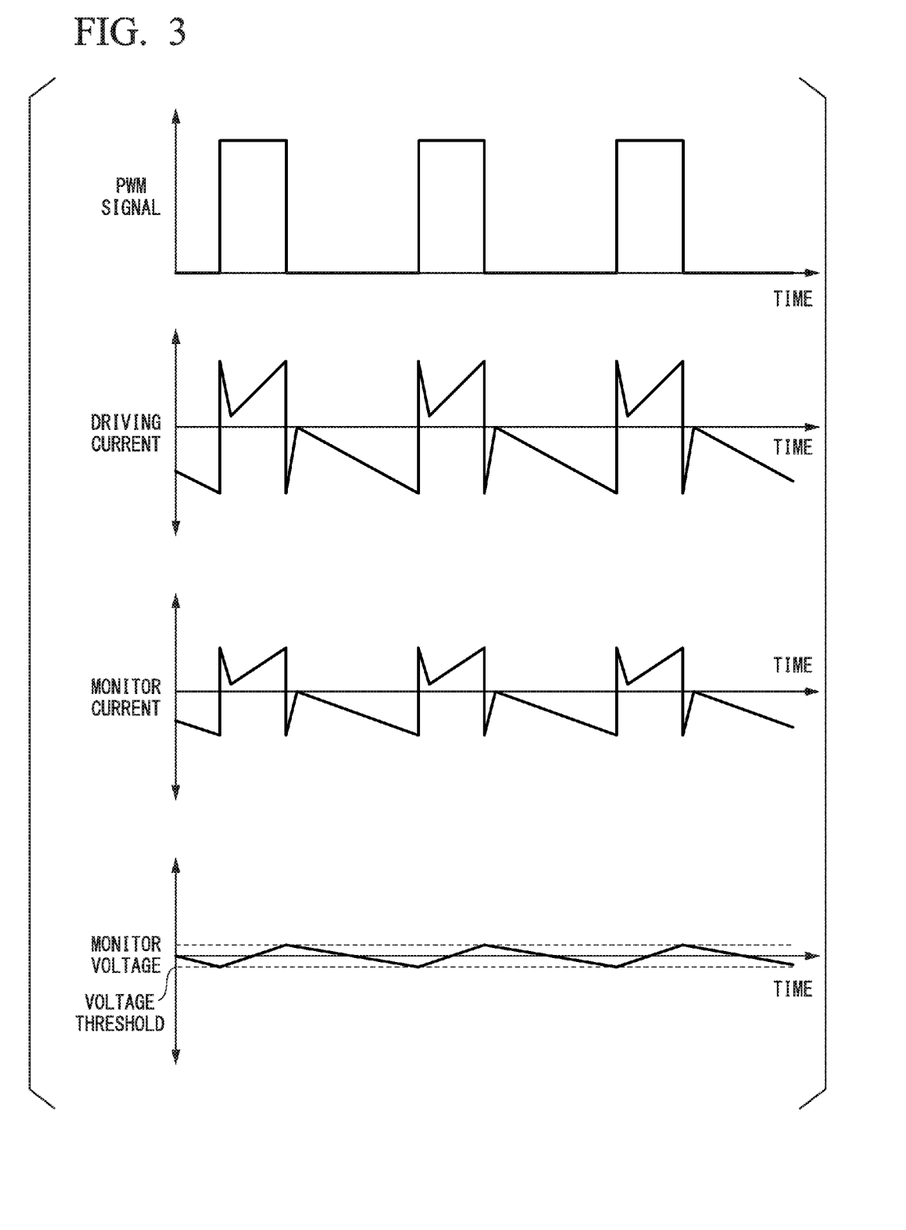
FIG. 3 is a waveform diagram illustrating a monitor voltage generating process in the embodiment of the present invention.
Figure 4:
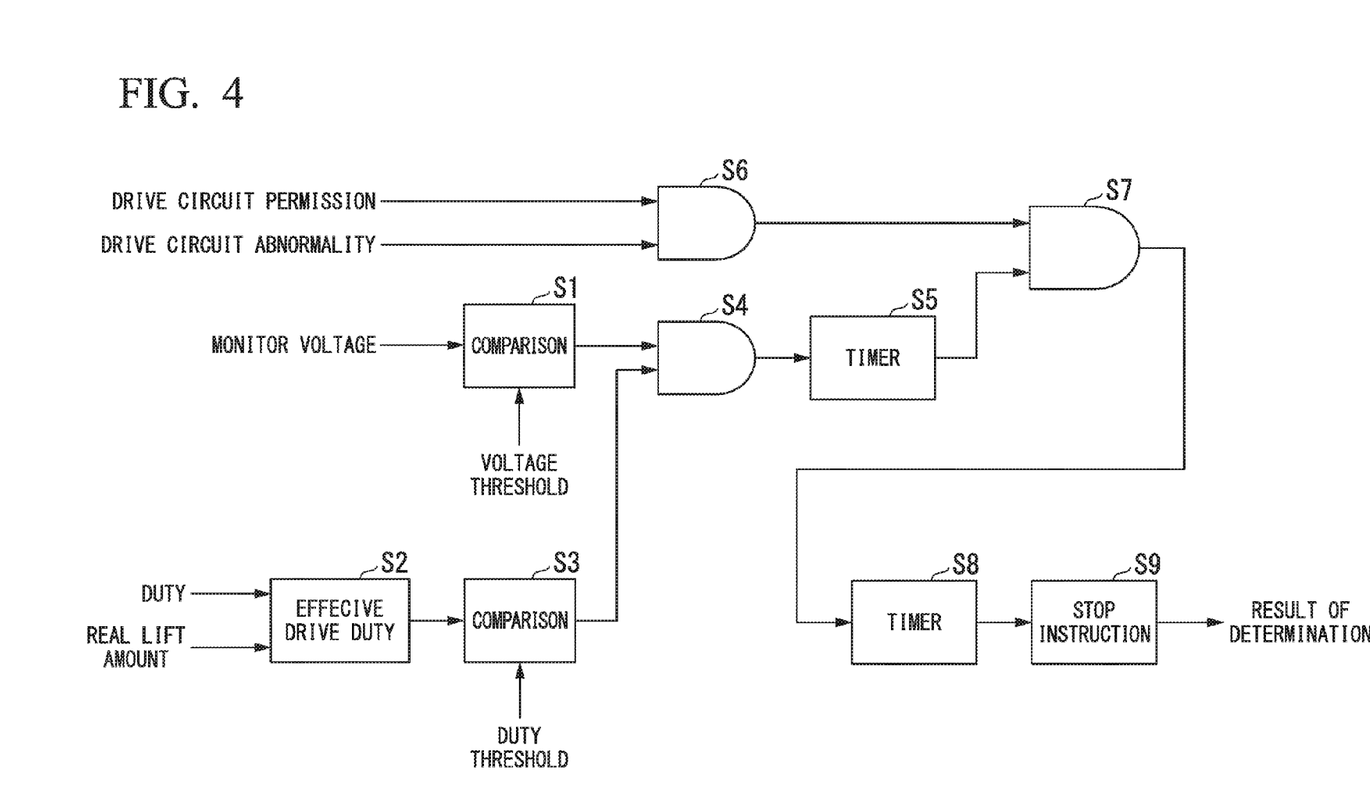
FIG. 4 is a processing system diagram illustrating a disconnection determining process in the embodiment of the present invention.

That is, as illustrated in FIG. 3, the drive circuit 3i generates a driving current on the basis of a square-wave PWM signal, and outputs a monitor current of the driving current to the current-voltage converting unit 3j. The monitor current is a shunted current of the driving current, and is a signal having the same waveform as the driving current. The current-voltage converting unit 3j performs current-voltage conversion on this monitor current in terms of hardware, and also performs low-pass filter processing in terms of hardware, thereby generating a monitor voltage. As illustrated in FIG. 3, the monitor voltage is a direct current voltage in which a ripple of the monitor current is sufficiently reduced.

This monitor voltage is output from the current-voltage converting unit 3j to the disconnection determining unit 3k. As illustrated in FIG. 4, the disconnection determining unit 3k compares the monitor voltage input from the current-voltage converting unit 3j with a pre-stored voltage threshold (step S1). The voltage threshold is a monitor voltage obtained in a state in which connection between the drive circuit 3i and the EWG motor 2 due to the transmission line W1 is broken, that is, an unloaded state of the drive circuit 3i.

Here, the unloaded state of the drive circuit 3i is a state in which no driving current is supplied from the drive circuit 3i to the EWG motor 2 (the load) (the driving current=0), and the monitor voltage in the unloaded state originally becomes "0." However, the monitor voltage in the unloaded state of the drive circuit 3i does not actually become "0" due to an error or the like in an element constant of the circuit element constituting the drive circuit 3i (the exclusive motor driving IC) or the current-voltage converting unit 3j. The monitor voltage in the unloaded state becomes a value varied by an individual difference or a temperature environment of the drive circuit 3i (the exclusive motor driving IC) or the current-voltage converting unit 3j.

In light of this, the voltage threshold is set to a highest monitor voltage (a reference monitor voltage) that can be conceived in view of design in the unloaded state of the drive circuit 3i. Therefore, a state in which the monitor voltage input from the current-voltage converting unit 3j is lower than or equal to the voltage threshold, that is, the logic value of the comparison processing S1 becomes "1," indicates that the driving current is lower than a normal current range.

The disconnection determining unit 3k calculates the effective drive duty ratio on the basis of the duty ratio (DUTY) of the PWM signal input from the DUTY setting unit 3h and the real lift amount input from the control variable converting unit 3b (step S2). The effective drive duty ratio is a duty ratio equivalent to the driving current that effectively contributes to driving of the EWG motor 2, and is calculated by subtracting a duty ratio (a back-emf duty ratio) equivalent to a back electromotive force generated from the duty ratio (DUTY) of the PWM signal by the EWG motor 2.

As is well known, a back electromotive force of a motor is an amount proportional to a rotational speed of the motor, and thus the back-emf duty ratio can be estimated from a rotational speed of the EWG motor 2. The disconnection determining unit 3k calculates a rate of change of the real lift amount input from the control variable converting unit 3b, obtains the rotational speed of the EWG motor 2 from the rate of change, and multiplies this rotational speed by a pre-acquired conversion coefficient to thereby find the back-emf duty ratio. The disconnection determining unit 3k subtracts the back-emf duty ratio from the duty ratio (DUTY) of the PWM signal, and thereby acquires the effective drive duty ratio.

The disconnection determining unit 3k compares this effective drive duty ratio and the pre-stored DUTY threshold (step S3). The logic value of the comparison processing S3 becomes "1" when the effective drive duty ratio is higher than or equal to the DUTY threshold. The DUTY threshold is a value (an absolute value) found by subtracting a pre-determined allowance amount from a minimum duty ratio that can be set by the DUTY setting unit 3h. That is, the state in which the logic value of the comparison processing S3 becomes "1" is a state in which the duty ratio (DUTY) of the PWM signal is within a typical driving range of the EWG motor 2 in a state in which an influence of the back electromotive force of the EWG motor 2 is excluded.

Here, the allowance amount in the DUTY threshold prevents unstable disconnection determination. That is, the effective drive duty ratio is generated on the basis of the monitor voltage input from the current-voltage converting unit 3j. However, when an error in generation of the monitor voltage in the current-voltage converting unit 3j or a sampling error in extraction of the monitor voltage in the disconnection determining unit 3k is taken into consideration, there is a possibility of erroneously detecting a state in which disconnection does not actually occur in the disconnection determining unit 3k to be occurrence of the disconnection when the DUTY threshold is set to a minimum duty ratio. In the present embodiment, the value (the absolute value) obtained by subtracting this allowance amount from the minimum duty ratio is set to the DUTY threshold, and thus the disconnection can be determined in a stable and accurate way.

The disconnection determining unit 3k performs AND processing on the logic value of the comparison processing S1 and the logic value of the comparison processing S3 (step S4). That is, the logic value of the AND processing S4 becomes "1" when the driving current is lower than a normal current range in a state in which the duty ratio (DUTY) of the PWM signal is within a general driving range of the EWG motor 2.

When the logic value of the AND processing S4 becomes "1," the disconnection determining unit 3k counts a continuous time of the state with a timer, and thereby it is determined whether or not the continuous time exceeds the first evaluation time (step S5). The logic value of the time counting determination processing S5 becomes "1" when the continuous time exceeds the first evaluation time.

Here, the time counting determination processing S5 is in consideration of a time delay in the generation of the effective drive duty ratio. That is, the disconnection determining unit 3k converts the monitor voltage (the analog amount) input from the current-voltage converting unit 3j into time series data (voltage data) by sampling, and acquires the effective drive duty ratio by performing digital processing on the voltage data. However, since a sampling interval when the monitor voltage is converted into the voltage data is relatively long, the time delay occurs between the effective drive duty ratio and the monitor voltage. In the present embodiment, the time counting determination processing S5 is performed to reduce influence of this time delay.

On the other hand, the disconnection determining unit 3k performs AND processing on the drive circuit permission and the drive circuit abnormality input from the drive circuit 3i (step S6). That is, a logic value of the AND processing S6 becomes "1" when no internal abnormality occurs in the drive circuit 3i (the exclusive motor driving IC) and in the case of a state in which the drive circuit 3i (the exclusive motor driving IC) can output the drive signal.

The disconnection determining unit 3k performs AND processing on the logic value of the time counting determination processing S5 and the logic value of the AND processing S6 (step S7). A logic value of the AND processing S7 becomes "1" when the drive circuit 3i (the exclusive motor driving IC) is in a normal state and when a state in which the driving current is lower than a normal current range continues for a first evaluation time in a state in which the duty ratio (DUTY) of the PWM signal is within the typical driving range of the EWG motor 2.

Further, when the logic value of this AND processing S7 becomes "1," the disconnection determining unit 3k counts a continuous time of that state with a timer, and thereby determines whether or not the continuous time exceeds the second evaluation time (step S8). A logic value of the time counting determination processing S8 becomes "1" when the continuous time exceeds the second evaluation time. When the logic value of the time counting determination processing S8 becomes "1," the disconnection determining unit 3k outputs an instruction to stop generating the PWM signal to the DUTY setting unit 3h (step S9). As a result, the EWG control unit 3 stops driving the EWG motor 2.

According to the present embodiment, the drive circuit permission and the drive circuit abnormality are also added to the duty ratio (DUTY) of the PWM signal and the driving current of the drive signal, and it is determined whether the transmission line W1 is disconnected. Thus, the disconnection of the transmission line W1 can be detected in an accurate and rapid way. Therefore, according to the present embodiment, the EWG motor 2 can be properly driven.

According to the present embodiment, since an effective drive duty ratio excluding influence of the back electromotive force of the EWG motor 2 is used, it can be determined whether the transmission line W1 is disconnected while excluding the operated states of the EWG motor 2. Therefore, the disconnection of the transmission line W1 can thereby be accurately and rapidly detected.

The present invention is not limited to the above embodiment, and for example the following modifications are considered.

(1) In the above embodiment, the EWG valve 1 (the wastegate valve) is used as the control target valve, but the present invention is not limited thereto. The present invention can be applied to various valves other than the EWG valve 1 (the wastegate valve) in the engine, that is, various flow control valves or on-off valves.

(2) In the above embodiment, the drive circuit permission and the drive circuit abnormality, that is, the operated states of the drive circuit 3i, are also added, and it is determined whether the transmission line W1 is disconnected, but the present invention is not limited thereto. For example, it may be determined whether the transmission line W1 is disconnected on the basis of only the duty ratio (DUTY) of the PWM signal and the monitor signal of the drive signal. Any one of the drive circuit permission or the drive circuit abnormality may be added to the duty ratio (DUTY) of the PWM signal and the monitor signal of the drive signal, and it may be determined whether the transmission line W1 is disconnected.

(3) In the above embodiment, the effective drive duty ratio is used to more accurately determine whether the transmission line W1 is disconnected, but the present invention is not limited thereto. For example, a state in which the rotation of the EWG motor 2 is stopped, that is, a state in which no back electromotive force occurs, may be specified, and it may be determined whether the transmission line W1 is disconnected using the duty ratio (DUTY) of the PWM signal input from the DUTY setting unit 3h in this state.

(4) In the above embodiment, the rotary motor is adopted as the actuator, but the present invention is not limited thereto. In place of the rotary motor, for example, a linear motor may be adopted.

(5) In the above embodiment, the exclusive motor driving IC having the driving current monitor function is adopted as the drive circuit 3i, but the present invention is not limited thereto. An exclusive motor driving IC having no driving current monitor function may be adopted as the drive circuit 3*i*, and the driving current monitor function may be realized by a separately provided additional circuit.

REFERENCE SIGNS LIST

1 EWG valve (valve)
2 EWG motor (actuator)
2*a* Lift sensor
3 EWG control unit
3*a* Filter unit
3*b* Control variable converting unit
3*c* Fully closed learning processing unit
3*d* Correcting unit
3*e* Final lift amount setting unit
3*f* Position control unit
3*g* Speed control unit
3*h* DUTY setting unit
3*i* Drive circuit
3*j* Current-voltage converting unit (disconnection detecting means)
3*k* Disconnection determining unit (disconnection detecting means)

The invention claimed is:

1. A valve control device which has a drive circuit supplying a drive signal to an actuator adjusting a degree of opening of a valve via a predetermined transmission line, generates a PWM signal on the basis of a target degree of opening supplied from an outside and a sensor signal indicating a real degree of opening of the valve, and supplies the generated PWM signal to the drive circuit, wherein the drive circuit includes a self-diagnostic function of diagnosing its own soundness, the valve control device comprising:
  a disconnection detecting unit configured to detect, on the basis of the PWM signal and a monitor signal of the drive signal, whether the transmission line is disconnected, and the disconnection detecting unit detects the disconnection of the transmission line on the basis of a result of self-diagnosis of the drive circuit in addition to the PWM signal and the monitor signal of the drive signal.

2. The valve control device according to claim 1, wherein the disconnection detecting unit acquires a monitor voltage of the drive signal as the monitor signal, and determines that the transmission line is disconnected when a state in which the monitor voltage is lower than or equal to a predetermined voltage threshold and the duty ratio of the PWM signal is higher than or equal to a predetermined DUTY threshold continues for a predetermined evaluation time.

3. The valve control device according to claim 1, wherein the disconnection detecting unit acquires a monitor voltage of the drive signal as the monitor signal, and determines that the transmission line is disconnected when, after a state in which the monitor voltage is lower than or equal to a predetermined voltage threshold and the duty ratio of the PWM signal is higher than or equal to a predetermined DUTY threshold continues for a predetermined first evaluation time, a sound state of the drive circuit continues for a predetermined second evaluation time.

4. The valve control device according to claim 1, wherein the valve is a wastegate valve provided for a supercharger for the engine.

5. The valve control device according to claim 1, wherein, when the actuator is a motor,
  the disconnection detecting unit calculates an effective drive duty ratio excluding influence of a back electromotive force generated from a duty ratio of the PWM signal by the motor, and compares the effective drive duty ratio with the DUTY threshold.

6. A valve system comprising:
  a valve;
  an actuator; and
  the valve control device according to claim 1.

7. A valve control device which has a drive circuit supplying a drive signal to an actuator adjusting a degree of opening of a valve via a predetermined transmission line, generates a PWM signal on the basis of a target degree of opening supplied from an outside and a sensor signal indicating a real degree of opening of the valve, and supplies the generated PWM signal to the drive circuit, the valve control device comprising:
  a disconnection detecting unit configured to detect, on the basis of the PWM signal and a monitor signal of the drive signal, whether the transmission line is disconnected,
  when the actuator is a motor, the disconnection detecting unit calculates an effective drive duty ratio excluding influence of a back electromotive force generated from a duty ratio of the PWM signal by the motor, and compares the effective drive duty ratio with the DUTY threshold.

\* \* \* \* \*